US010300629B2

(12) United States Patent
Kaneider et al.

(10) Patent No.: US 10,300,629 B2
(45) Date of Patent: May 28, 2019

(54) METHOD FOR CONTROLLING A WALL SAW SYSTEM WHEN MAKING A SEPARATING CUT

(71) Applicant: Hilti Aktiengesellschaft, Schaan (LI)

(72) Inventors: Wilfried Kaneider, Rankweil (AT); Dragan Stevic, Feldkirch-Tosters (AT); Christian Bereuter, Lingenau (AT); Dieter Profunser, Zwischenwasser (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/509,445

(22) PCT Filed: Sep. 1, 2015

(86) PCT No.: PCT/EP2015/069911
§ 371 (c)(1),
(2) Date: Mar. 7, 2017

(87) PCT Pub. No.: WO2016/037891
PCT Pub. Date: Mar. 17, 2016

(65) Prior Publication Data
US 2017/0291324 A1 Oct. 12, 2017

(30) Foreign Application Priority Data
Sep. 8, 2014 (EP) .................................... 14003100

(51) Int. Cl.
*B26D 3/00* (2006.01)
*B26D 1/00* (2006.01)
(Continued)

(52) U.S. Cl.
CPC ............. *B28D 7/005* (2013.01); *B28D 1/042* (2013.01); *B28D 1/044* (2013.01); *B28D 1/045* (2013.01); *B28D 1/10* (2013.01)

(58) Field of Classification Search
CPC .......... B28D 1/044; B28D 1/10; B28D 7/005; B28D 1/045; B23D 59/002; B23D 59/008
(Continued)

(56) References Cited

U.S. PATENT DOCUMENTS 5,237,897 A * 8/1993 Wijesinghe ............ B23D 55/10 83/72
5,689,072 A * 11/1997 Chiuminatta ........ B23D 59/001 29/404
(Continued)

FOREIGN PATENT DOCUMENTS

DE 10 2005 000 013 A1 8/2006
EP 1 693 173 B1 8/2006
(Continued)

OTHER PUBLICATIONS

PCT/EP2015/069911, International Search Report dated Nov. 10, 2015, with partial English translation (Five (5) pages).
(Continued)

*Primary Examiner* — Ghassem Alie
*Assistant Examiner* — Bharat C Patel
(74) *Attorney, Agent, or Firm* — Crowell & Moring LLP

(57) ABSTRACT

A method for controlling a wall system when creating a separating cut in a workpiece between a first and a second end point is disclosed. The wall saw system includes a wall saw having a saw head, a pivotable saw arm, a saw blade and a blade guard. The separating cut is carried out in a plurality of main cuts. The pivoting movement of the saw arm in a main cutting angle is carried out in at least two steps with at least one intermediate angle, where a free cut of the saw blade is carried out in the respective intermediate angle between the pivoting movements of the saw arm.

14 Claims, 7 Drawing Sheets

(51) Int. Cl.

| | |
|---|---|
| ***B23Q 15/00*** | (2006.01) |
| ***B28D 7/00*** | (2006.01) |
| ***B28D 1/04*** | (2006.01) |
| ***B28D 1/10*** | (2006.01) |

(58) Field of Classification Search

USPC ...... 83/13, 74–76, 34, 471.3, 473, 490, 169, 83/520, 663, 39

See application file for complete search history.

(56) References Cited

U.S. PATENT DOCUMENTS

| | | | | |
|---|---|---|---|---|
| 5,694,821 | A * | 12/1997 | Smith | B23D 59/002 700/188 |
| 6,320,344 | B1 * | 11/2001 | Sakamoto | G05B 19/19 318/567 |
| 6,484,711 | B2 * | 11/2002 | Acker | B27B 9/02 125/13.01 |
| 9,327,424 | B2 * | 5/2016 | Jonsson | B28D 1/045 |
| 9,623,587 | B2 * | 4/2017 | Johnsen | B28D 1/045 |
| 9,798,313 | B2 * | 10/2017 | Brugger | G05B 19/402 |
| 2006/0189258 | A1 * | 8/2006 | Schaer | B23D 59/002 451/5 |
| 2008/0276773 | A1 * | 11/2008 | Togare | B23D 45/024 83/34 |
| 2011/0203565 | A1 * | 8/2011 | Hilsgen | B23D 45/027 125/13.03 |
| 2012/0234305 | A1 * | 9/2012 | Jonsson | B23D 47/12 125/13.03 |
| 2013/0180371 | A1 | 7/2013 | Flock | |
| 2016/0031022 | A1 | 2/2016 | Brugger | |

FOREIGN PATENT DOCUMENTS

| | | | |
|---|---|---|---|
| JP | 2006-231920 | A | 9/2006 |
| JP | 2016-507390 | A | 3/2016 |
| JP | 2016-507391 | A | 3/2016 |
| JP | 2016-507392 | A | 3/2016 |
| WO | WO 2014/124912 | A1 | 8/2014 |
| WO | WO 2014/124931 | A1 | 8/2014 |
| WO | WO 2014/128095 | A1 | 8/2014 |

OTHER PUBLICATIONS

European Search Report issued in European counterpart application No. 14003100.6-1709 dated Apr. 24, 2015, with Statement of Relevancy (Seven (7) pages).

U.S. Patent Application, "Method for Controlling a Wall Saw System When Making a Separating Cut", filed Mar. 7, 2017, Inventor Wilfried Kaneider et al.

U.S. Patent Application, "Method for Controlling a Wall Saw System During the Creation of a Separation Cut", filed Mar. 7, 2017, Inventor Wilfried Kaneider et al.

U.S. Patent Application, "Method for Controlling a Wall Saw System During the Creation of a Separating Cut", filed Mar. 7, 2017, Inventor Wilfried Kaneider et al.

Japanese Notice of Reasons for Refusal issued in Japanese counterpart application No. 2017-513095 dated Apr. 4, 2018, with partial English translation (Eight (8) pages).

A Guide for a Scheme of Execution "A Wall Sawing Method", Japan, General Corporate Judicial Person Japan Concrete Sawing & Drilling Association, Jul. 1, 2011, 12th Edition (28 total pages).

* cited by examiner

METHOD FOR CONTROLLING A WALL SAW SYSTEM WHEN MAKING A SEPARATING CUT

This application claims the priority of International Application No. PCT/EP2015/069911, filed Sep. 1, 2015, and European Patent Document No. 14003100.6, filed Sep. 8, 2014, the disclosures of which are expressly incorporated by reference herein.

BACKGROUND AND SUMMARY OF THE INVENTION

The present invention relates to a method for controlling a wall saw system when making a separating cut.

A method is known from EP 1 693 173 B1 for controlling a wall saw system when making a separating cut in a workpiece between a first end point and a second end point. The wall saw system comprises a guide track and a wall saw with a saw head, a motorized feed unit that displaces the saw head parallel to a feed direction along the guide track, and at least one saw blade that is attached to a saw arm of the saw head and is driven about a rotation axis by a drive motor. The saw arm is pivotably designed by means of a pivot motor and a pivot axis. By means of a pivot motion of the saw about the swivel axis, the penetration depth of the saw blade into the workpiece is changed. The motorized feed unit comprises a guide carriage and a feed motor, wherein the saw is attached to the guide carriage and is displaced via the feed motor along the guide track. To monitor the wall saw system, there is provided a sensor device with a pivot angle sensor and a displacement sensor. The pivot angle sensor measures the current pivot angle of the saw arm and the displacement sensor measures the current position of the saw head on the guide track. The measured values for the current pivot angle of the saw arm and the current position of the saw head are transmitted on a regular basis to a control unit of the wall saw.

The known method for controlling a wall saw system is subdivided into a preparatory part and a control unit-controlled processing of the separating cut. In the preparatory part, the user determines at least the saw blade diameter of the saw blade, the positions of the first and second end points in the feed direction, and the end depth of the separating cut; additional parameters may be the material of the workpiece to be worked on and the dimensions of the embedded rebar. From the input parameters, the control unit determines for the separating cut a suitable main cutting sequence of main cuts, wherein the main cutting sequence comprises at least a first main cut having a first main cutting angle of the saw arm and a first diameter of the utilized saw blade, as well as a subsequent second main cut having a second main cutting angle of the saw arm and a first diameter of the utilized saw blade.

The known method for controlling a wall saw system has the disadvantage that for cutting hard materials, no special method is provided for controlling the wall saw. When cutting hard materials, polishing of the cutting segments can occur during the pivot motion of the saw blade in the workpiece. The polishing of the cutting segments reduces the service life of the cutting segments and the cutting speed of the saw blade.

The object of the present invention consists in developing a method for controlling a wall saw system, which allows for the cutting of hard materials and in which the service life and the cutting speed of the saw blade are optimized.

In the method for controlling a wall saw system referred to in the beginning, this task is achieved according to the invention by the features of the independent claim. Advantageous developments are indicated in the dependent claims.

According to the invention, it is provided that the pivot motion of the saw arm out of the first main cutting angle into a new pivot angle is performed in at least two steps with at least one intermediate angle, wherein between the pivot motions of the saw arm into the intermediate angles, a free-cutting of the saw blade occurs in each case.

Saw blades for wall saws are constructed in a two-part manner out of a base body and cutting segments on the perimeter of the base body. The cutting segments consist of a matrix material, in which diamond particles are embedded. To expose the diamond particles during cutting, a minimum surface pressure is required. If the surface pressure falls below the minimum surface pressure, the diamond particles are not exposed during cutting with the saw blade and there is the risk that a polishing of the cutting segments occurs, which reduces the service life of the cutting segments and the cutting speed of the sawblade. The minimum surface pressure of the cutting segments corresponds to a critical arc length of the saw blade, which may not be exceeded. The value of the critical arc length of a saw blade depends on multiple parameters, including the specification of the saw blade, the material of the workpiece to be cut, as well as the power and torque of the drive motor for the saw blade.

The breakdown of the pivot motion into at least two steps reduces the risk that a polishing of the saw blade occurs. A smaller pivot angle results in reducing the arc length of the saw blade, which is engaged with the workpiece, or the number of the cutting segments, which are engaged with the workpiece. The free-cutting of the saw blade, which occurs between the pivot motions of the saw arm, results in the arc length of the saw blade, engaged with the workpiece, being further reduced.

Preferably, the pivot motion of the saw arm out of the first main cutting angle into the new pivot angle is performed in n steps with n−1 intermediate angles, wherein between the pivot motions of the saw arm into the intermediate angles, a free-cutting of the saw blade occurs. The number of steps depends among other things on the specification of the saw blade, the hardness of the material, as well as the power and torque of the drive motor for the saw blade. The intermediate angles can be established by the operator or the intermediate angles can be established by the control unit of the wall saw system as a function of various boundary conditions. For the method according to the invention, the intermediate angles represent an input variable that is used to control the wall saw.

Preferably, prior to starting the processing controlled by the control unit, a saw arm length of the saw arm, which is defined as the distance between the pivot axis of the saw arm and the rotation axis of the saw blade, and a distance between the pivot axis and the top side of the workpiece are defined. For the controlled processing of a separating cut, various parameters must be known to the control unit. These include the saw arm length that represents a fixed, device-specific dimension of the wall saw, and the perpendicular distance between the pivot axis and the surface of the workpiece that depends on, besides the geometry of the wall saw, the geometry of the guide track used as well.

In a particularly preferred manner, prior to starting the controlled processing, a first width for a blade guard used in the first main cut and a second width for a blade guard used in the second main cut are established, wherein the first and second widths respectively are composed of a first distance of the rotation axis to the first blade guard edge and a second distance of the rotation axis to the second blade guard edge. When an end point represents an obstacle, the position controlling of the saw head occurs via the blade guard edge, facing the obstacle, of the utilized blade guard. For an asymmetrical blade guard, the first and second distances of the rotation axis to the blade guard edges are different, whereas for a symmetrical blade guard, the first and second distances of the blade guard edges coincide with half the width of the blade guard.

In a first preferred embodiment of the method according to the invention, the pivot motion occurs from the first main cutting angle into the new main cutting angle at the first end point and the saw head is positioned in the $j^{th}$ cut, j=1 to n−1, in such a manner that after the pivot motion of the saw arm in the $j^{th}$ intermediate angle, a first boundary, facing the first end point, of the wall saw coincides with the first end point, wherein the first boundary of the wall saw is formed by a first upper exit point, facing the first end point, of the utilized saw blade on the top side of the workpiece when the first end point represents a free end point without an obstacle, by a first saw blade edge, facing the first end point, of the utilized saw blade when the first end point represents an obstacle and processing occurs without a blade guard, and by a first blade guard, facing the first end point, of the utilized blade guard when the first end point represents an obstacle and processing occurs with a blade guard.

Every step comprises the method steps of positioning the saw head, pivoting the saw arm into the intermediate angle, and moving the saw head for free-cutting of the saw blade. After the pivot motion of the saw arm into the intermediate angle, the first boundary coincides with the first end point. For a free end point without an obstacle, position controlling occurs via the first upper exit point of the saw blade on the top side of the workpiece. When the first end point represents an obstacle, the first saw blade edge (cutting without a blade guard) or the first blade guard edge (cutting with a blade guard) are utilized for position controlling.

After the pivot motion of the saw arm into the $j^{th}$ intermediate angle, where j=1 to n−1, the first upper exit point coincides with the first end point when the pivot axis has a distance to the first end point of $\sqrt{[h(\pm\beta_{1,j})\cdot(D-h(\pm\beta_{1,j}))]}-\delta\cdot\sin(\pm\beta_{1,j})$, wherein $h(\pm\beta_{1,j})=D/2-\Delta-\delta\cdot\cos(\pm\beta_{1,j})$ refers to the penetration depth of the utilized saw blade into the workpiece for the $j^{th}$ intermediate angle, the first saw blade edge of the utilized saw blade coincides with the first end point when the pivot axis has a distance to the first end point of $D/2-\delta\cdot\sin(\pm\beta_{1,j})$, and the first blade guard edge of the utilized blade guard coincides with the first end point when the pivot axis has a distance to the first end point of $B_{2a}-\delta\cdot\sin(\pm\beta_{1,j})$.

After the pivot motion, the saw arm in the $j^{th}$ step, j=1 to n−1, with the saw arm tilted at the $j^{th}$ intermediate angle, is moved by a displacement distance of $\sqrt{[h_2\cdot(D-h_2)]}-\delta\cdot\sin(\pm\alpha_2)$, wherein $h_2=h(\pm\alpha_2, D)=D/2-\Delta-\delta\cdot\cos(\pm\alpha_2)$ refers to the penetration depth of the utilized saw blade into the workpiece for the second main cutting angle. By means of the feed motion of the saw head, the saw blade is cut free, and the part of the saw blade engaged with the workpiece is reduced.

After the $n-1^{th}$ step, the saw head is positioned in such a manner that after the pivot motion of the saw arm into the new main cutting angle, the first boundary, facing the first end point, of the wall saw coincides with the first end point. After the pivot motion of the saw arm into the second main cutting angle, the first upper exit point coincides with the first end point when the pivot axis has a distance to the first end point of $\sqrt{[h_2\cdot(D-h_2)]}-\delta\cdot\sin(\pm\alpha_2)$, wherein $h(\pm\alpha_2)=D/2-\Delta-\delta\cdot\cos(\pm\alpha_2)$ refers to the penetration depth of the utilized saw blade into the workpiece at the second main cutting angle with the second diameter, the first saw blade edge of the utilized saw blade coincides with the first end point when the pivot axis has a distance to the first end point of $D/2-\delta\cdot\sin(\pm\alpha_2)$, and the first blade guard edge of the utilized blade guard coincides with the first end point when the pivot axis has a distance to the first end point of $B_a-\delta\cdot\sin(\pm\alpha_2)$.

In a second preferred embodiment of the method according to the invention, the pivot motion occurs from a first main cutting angle into the new main cutting angle at the second end point and the saw head is positioned in the $j^{th}$ intermediate cut, j=1 to n−1, in such a manner that after the pivot motion of the saw arm into the $j^{th}$ intermediate angle, a second boundary, facing the second end point, of the wall saw coincides with the second end point, wherein the second boundary of the wall saw is formed by a second upper exit point, facing the second end point, of the utilized saw blade on the top side of the workpiece when the second end point represents a free end point without an obstacle, by a second saw blade edge, facing the second end point, of the utilized saw blade when the second end point represents an obstacle and processing occurs without a blade guard, and by a second blade guard edge, facing the second end point, of the utilized blade guard when the second end point represents an obstacle and processing occurs with a blade guard.

Every step comprises the method steps of positioning the saw head, pivoting the saw arm into the intermediate angle, and moving the saw head for the free-cutting of the saw blade.

After the pivot motion of the saw arm into the $j^{th}$ intermediate angle, where j=1 to n−1, the second upper exit point coincides with the second end point when the pivot axis has a distance to the second end point of $\sqrt{[h(\pm\beta_{2,j})\cdot(D-h(\pm\beta_{2,j}))]}+\delta\cdot\sin(\pm\beta_{2,j})$, wherein $h(\pm_{2,j})=D/2-\Delta-\delta\cdot\cos(\pm\beta_{2,j})$ refers to the penetration depth of the utilized saw blade into the workpiece for the $j^{th}$ intermediate angle, the second saw blade edge of the utilize saw blade coincides with the second end point when the pivot axis has a distance to the second end point of $D/2+\delta\cdot\sin(\pm\beta_{2,j})$, and the second blade guard edge of the utilized blade guard coincides with the second end point when the pivot axis has a distance to the first end point of $B_b+\delta\cdot\sin(\pm\beta_{2,j})$.

After the pivot motion, the saw head in the $j^{th}$ step, j=1 to n−1, with the saw arm tilted at the $j^{th}$ intermediate angle, is moved by a displacement distance of $\sqrt{[h_2\cdot(D-h_2)]}-\delta\cdot\sin(\pm\alpha_2)$, wherein $h_2=h(\pm\alpha_2, D)=D/2-\Delta-\delta\cdot\cos(\pm\alpha_2)$ refers to the penetration depth of the utilized saw blade into the workpiece for the second main cutting angle. By means of the feed motion of the saw head, the saw blade is cut free and the part of the saw blade engaged with the workpiece is reduced.

After the $n-1^{th}$ step, the saw head is positioned in such a way that after the pivot motion of the saw arm into the new main cutting angle, the second boundary, facing the second end point, of the wall coincides with the second end point.

After the pivot motion of the saw arm into the second main cutting angle, the second upper exit point coincides with the second end point when the pivot axis has a distance to the second end point of $\sqrt{[h_2\cdot(D-h_2)]}+\delta\cdot\sin(\pm\alpha_2)$, wherein $h(\pm\alpha_2)=D/2-\Delta-\delta\cdot\cos(\pm\alpha_2)$ refers to the penetration depth of the utilized saw blade into the workpiece for the second main cutting angle, the second saw blade edge of the utilized saw blade coincides with the second end point when the pivot axis has a distance to the second end point of D/2+

$\delta \cdot \sin(\pm\alpha_2)$, and the second blade guard edge of the utilized blade guard coincides with the second end point when the pivot axis has a distance to the second end point of $B_b + \delta \cdot \sin(\pm\alpha_2)$.

The first and second main cuts are performed with a saw blade and a blade guard. Alternatively, the first main cut is performed by a first saw blade having a first saw blade diameter and a first blade guard having a first blade guard width, and the second main cut is performed by a second saw blade having a second saw blade diameter and a second blade guard having a second blade guard width.

Embodiments of the invention are described hereafter by means of drawings. These are not necessarily meant to depict the embodiments true to scale; rather, the drawings, where useful for explanation purposes, is executed in a schematic and/or slightly distorted form. In regard to supplements of the teachings directly evident from the drawings, one shall refer to the relevant prior art. In doing so, one shall take into account that diverse modifications and changes pertaining to the form and detail of an embodiment may be undertaken without deviating from the general idea of the invention. The features of the invention disclosed in the description, drawings, and claims may be significant individually as well as in any combination for developing the invention. In addition, falling within the scope of the invention are all combinations of at least two features disclosed in the description, drawings, and/or claims. The general idea of the invention is not restricted to the exact form or detail of the preferred embodiments shown and described below or limited to a subject matter that would be restricted in comparison to the subject matter claimed in the claims. For given dimensional ranges, values lying within the mentioned limits shall be disclosed as limits and they can be implemented and claimed as desired. For simplicity's sake, the same reference signs are used below for identical or similar parts or parts with identical or similar functions.

DETAILED DESCRIPTION OF THE DRAWINGS

Figure 1:
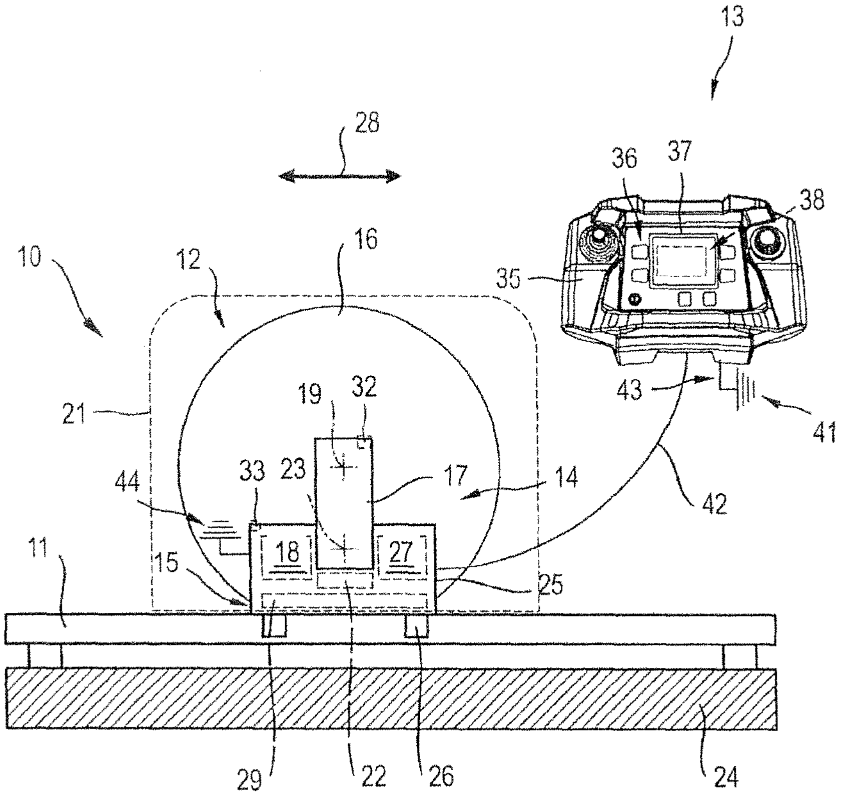
FIG. 1 illustrates a wall saw system with a guide track and a wall saw.

FIG. 1 depicts a wall saw system 10 with a guide track 11, a tool device 12 displaceably arranged on guide track 11, and a remote control unit 13. The tool device is designed as a wall saw 12 and comprises a cutting unit 14 and a motorized feed unit 15. The cutting unit is designed as a saw head 14 and comprises a cutting tool 16 designed as a saw blade, which is attached to a saw arm 17 and is driven by a drive motor 18 about a rotation axis 19.

To protect the operator, saw blade 16 is enclosed by a blade guard 21, which is attached to saw arm 17. Saw arm 17 is designed to be pivotable by a pivot motor 22 about a pivot axis 23. Pivot angle α of saw arm 17 along with a saw blade diameter D of saw blade 16 determines how deep saw blade 16 penetrates into a workpiece 24 to be cut. Drive motor 18 and pivot motor 22 are arranged in a device housing 25. Motorized feed unit 15 comprises a guide carriage 26 and a feed motor 27, which in the embodiment is also arranged in device housing 25. Saw head 14 is attached on guide carriage 26 and is designed to be displaceable via feed motor 27 along guide track 11 in a feed direction 28. Arranged in device housing 25 are, besides motors 19, 22, 27, a control unit 29 for controlling saw head 14 and motorized feed unit 15.

To monitor wall saw system 10 and the cutting process, a sensor device having multiple sensor elements is provided. A first sensor element 32 is designed as a pivot angle sensor and a second sensor element 33 is designed as a displacement sensor. Pivot angle sensor 32 measures the current pivot angle of saw arm 17 and displacement sensor 33 measures the current position of saw head 14 on guide track 11. The measurement variables are transmitted by pivot angle sensor 32 and displacement sensor 33 to control unit 29 and are used to control wall saw 12.

Remote control 13 comprises a device housing 35, an input device 36, a display device 37, and a control unit 38, which is arranged inside device housing 35. Control unit 38 converts the inputs of input device 36 into control commands and data, which are transmitted via a first communications link to wall saw 12. The first communications link is designed as a wire- and cable-less communications link 41 or as communications cable 42. The wire- and cable-less communications link is designed in the embodiment as radio link 41, which is formed between a first radio unit 43 on remote control unit 13 and a second radio unit 44 on tool device 12. Alternatively, the wire- and cable-less communications link 41 may be designed in the form of an infrared, Bluetooth, WLAN, or WiFi link.

Figure 2A:
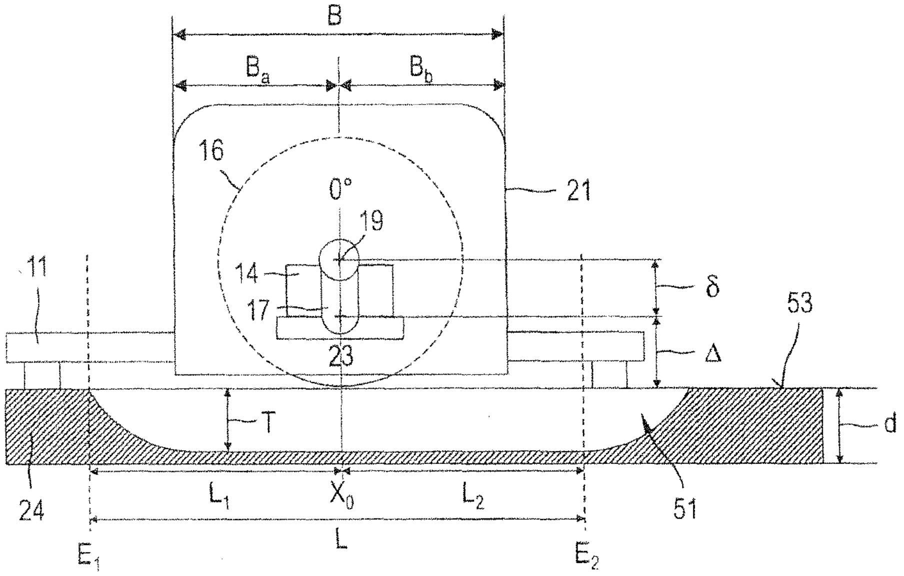
FIGS. 2A, B illustrate processing a separating cut between a first and second free end point without an obstacle.

FIGS. 2A, B depict guide track 11 and wall saw 12 of wall system 10 of FIG. 1 when making a separating cut 51 in workpiece 24 having workpiece thickness d. Separating cut 51 has an end depth T and moves in feed direction 28 between a first end point $E_1$ and a second end point $E_2$. A direction parallel to feed direction 28 is defined as direction X, wherein positive direction X is oriented from first end point $E_1$ to second end point $E_2$, and a direction perpendicular to direction X into the depth of workpiece 24 is defined as direction Y.

The end point of a separating cut may be defined as a free end point without an obstacle or as an obstacle. Both end points can thereby be defined as free end points without obstacles, both end points as obstacles, or an end point as a free end point and the other end point as an obstacle. An overcut may be permitted at a free end point without an obstacle. By means of the overcut, the cutting depth at the end point reaches end depth T of the separating cut. In the embodiments of FIGS. 2A, B, end points $E_1$, $E_2$ form free end points without obstacles, wherein overcutting is not permitted at the free first end point end point $E_1$, and overcutting does occur at second end point $E_2$.

FIG. 2A depicts saw head 14 in an installation position $X_0$ and saw arm 17 in a basic position of 0°. Saw head 14 is positioned by the operator, by means of guide carriage 26, in installation position $X_0$ on guide track 11. Installation position $X_0$ of saw head 14 lies between first and second end points $E_1$, $E_2$ and is determined by the position of pivot axis 23 in feed direction 28. The position of pivot axis 23 is particularly suited as a reference position $X_{Ref}$ to monitor the position of saw head 14 and control wall saw 12, since the X-position of pivot axis 23 remains unchanged even during the pivot motion of saw arm 17.

Alternatively, a different X-position can be established as a reference position on saw head 14, wherein the distance in direction X to pivot axis 23 must be known in this case.

In the embodiment, the X-positions of first and second end points $E_1$, $E_2$ are established by entering partial lengths. The distance between installation position $X_0$ and first end point $E_1$ are determined by a first partial length $L_1$ and the distance between installation position $X_0$ and second end point $E_2$ are determined by a second partial length $L_2$. Alternatively, the X-positions of end points $E_1$, $E_2$ may be established by entering a partial length ($L_1$ or $L_2$) and a total length L as a distance between end points $E_1$, $E_2$.

Separating cut 51 is made in multiple partial cuts until the desired end depth T is reached. The partial cuts between the first and second end points $E_1$, $E_2$ are defined as main cuts and the cutting sequence of the main cuts is defined as the main cutting sequence. At the end points of the separating cut, one can perform additional corner-cutting that is referred to as obstacle cutting for an obstacle, and overcut cutting for a free end point with overcutting.

The main cutting sequence can be established by the operator or the main cutting sequence can be established by the control unit of the wall saw system as a function of multiple boundary conditions. Conventionally, the first main cut, which is also referred to as a precut, is carried out with a reduced cutting depth and reduced power of the drive motor to prevent the saw blade from becoming polished. The additional main cuts are generally performed with the same cutting depth, but they may also have various cutting depths. The boundary conditions typically established by an operator include the cutting depth of the precut, the efficiency of the precut, and the maximum cutting depth of the additional main cuts. From these boundary conditions, the control unit can determine the main cutting sequence.

The main cuts of a separating cut are performed with one saw blade diameter or with two or more saw blade diameters. If multiple saw blades are used, the cutting generally begins with the smallest saw blade diameter. To be able to assemble saw blade 16 on saw arm 17, saw blade 16 must be arranged in the basic position of saw arm 17 above workpiece 24. Whether this boundary condition is met depends on two device-specific variables of wall saw system 10: on the one hand, a perpendicular distance Δ between pivot axis 23 of saw arm 17 and on the other, a top side 53 of workpiece 24 and a saw arm length δ of saw arm 17, which is defined as the distance between rotation axis 19 of saw blade 16 and pivot axis 23 of saw 17. When the sum of these two device-specific variables is greater than half the saw blade diameter D/2, saw blade 16 is arranged in the basic position above workpiece 24. Saw blade length δ is a fixed device-specific variable of wall saw 12, whereas perpendicular distance Δ between pivot axis 23 and surface 53 depends, besides on the geometry of wall saw 12, also on the geometry of utilized guide track 11.

Saw blade 16 is attached on a flange on saw arm 17 and is driven in sawing mode by drive motor 18 about rotation axis 19. In the basic position of saw arm 17, which is depicted in FIG. 2A, the pivot angle is 0° and rotation axis 19 of saw blade 16 lies in depth direction 52 above pivot axis 23. Saw blade 16 is moved out of the basic position at 0° into workpiece 24 by a pivot motion of saw arm 17 about pivot axis 23. During the pivot motion of saw arm 17, saw blade 16 is driven by drive motor 18 about rotation axis 19.

To protect the operator, saw blade 16 is to be enclosed by blade guard 21 when in operation. Wall saw 12 is operated with blade guard 21 or without blade guard 21. To make the separating cut in the region of end points $E_1$, $E_2$, removal of blade guard 21 may be provided for example. If various saw blade diameters are used to make the separating cut, one generally also uses various blade guards with corresponding blade guard widths.

Figure 2B:
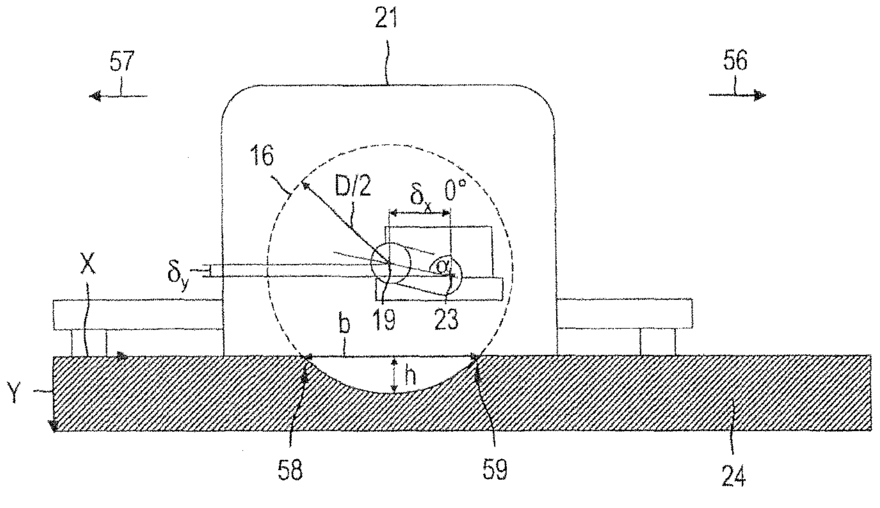

FIG. 2B depicts saw arm 17, which is tilted in a negative rotation direction 54 at a negative pivot angle −α. Saw arm 17 is adjustable in negative rotation direction 54 between pivot angles from 0° to −180° and in a positive rotation direction 55, oriented opposite negative rotation direction 54, between pivot angles 0° to +180°. The arrangement of saw arm 17 depicted in FIG. 2B is referred to as a pulling configuration when saw head 14 is moved in a positive feed direction 56. When saw head 14 moves in a negative feed direction 57, oriented opposite positive feed direction 56, the arrangement of saw arm 17 is referred to as a pushing configuration.

Given a pivot angle of ±180°, the maximum penetration depth of saw blade 16 into workpiece 24 is reached. By means of the pivot motion of saw arm 17 about pivot axis 23, the position of rotation axis 19 is shifted in direction X and direction Y. The shift of rotation axis 19 is thereby dependent on saw arm length δ and pivot angle α of saw arm 17. The displacement distance $\delta_x$ in direction X amounts to $\delta \cdot \sin(\pm\alpha)$ and the displacement distance $\delta_y$ in direction Y amounts to $\delta \cdot \cos(\pm\alpha)$.

In workpiece 24, saw blade 16 produces a cutting wedge in the form of a circular segment having a height h and a width b. Height h of the circular segment corresponds to the penetration depth of saw blade 16 in workpiece 24. For penetration depth h, equation $D/2=h+\Delta+\delta\cdot\cos(\alpha)$ applies, wherein D is the saw blade diameter, h is the penetration depth of saw blade 16, Δ is the perpendicular distance between pivot axis 23 and top side 53 of workpiece 24, δ is the saw arm length, and α is the first pivot angle; for width b, the equation $b^2=D/2-8h-4h^2=4Dh-4h^2=4h\cdot(D-h)$, wherein h is the penetration depth of saw blade 16 in workpiece 24 and D is the saw blade diameter.

Controlling wall saw 12 during the separating cut depends on whether the end points are defined as obstacles, and for an obstacle, whether cutting occurs with blade guard 21 or without blade guard 21. For a free end point without an obstacle, controlling wall saw 12 in the method according to the invention occurs by means of upper exit points of saw blade 16 on top side 53 of workpiece 24. The upper exit points of saw blade 16 can be calculated from reference position $X_{Ref}$ of pivot axis 23 in direction X, displacement path $\delta_x$ of rotation axis 19 in direction X, and width b. An upper exit point facing first end point $E_1$ is referred to as first upper exit point 58 and an upper exit point facing second end point $E_2$ is referred to as second upper exit point 59. For first upper exit point 58, $X(58)=X_{Ref}+\delta_x-b/2$ applies, and for second upper exit point 59, $X(59)=X_{Ref}+\delta_x+b/2$ applies where $b=\sqrt{[h\ (D-h)]}$ and $h=h(\alpha, D)$.

If end points $E_1$, $E_2$ are defined as obstacles, overrunning end points $E_1$, $E_2$ with wall saw 12 is not possible. In this case, wall saw 12 in the method according to the invention is controlled via reference position $X_{Ref}$ of pivot axis 23 and the boundary of wall saw 12. One thereby differentiates between processing without blade guard 21 and processing with blade guard 21.

Figure 3A:
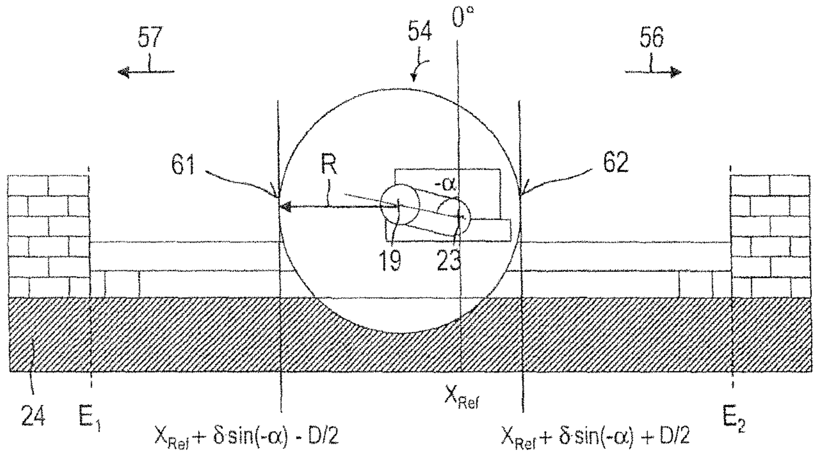
FIGS. 3A, B illustrate processing a separating cut between a first and second obstacle with a saw blade that is not enclosed by a blade guard.

FIGS. 3A, B depict wall saw system 10 when making a separating cut between first end point $E_1$ and second end point $E_2$, which are defined as obstacles, wherein the cutting occurs without blade guard 21. When cutting without blade guard 21, a first saw blade edge 61, which faces first end point $E_1$, and a second saw blade edge 62, which faces second end point $E_2$, form the boundary of wall saw 12.

Figure 3B:
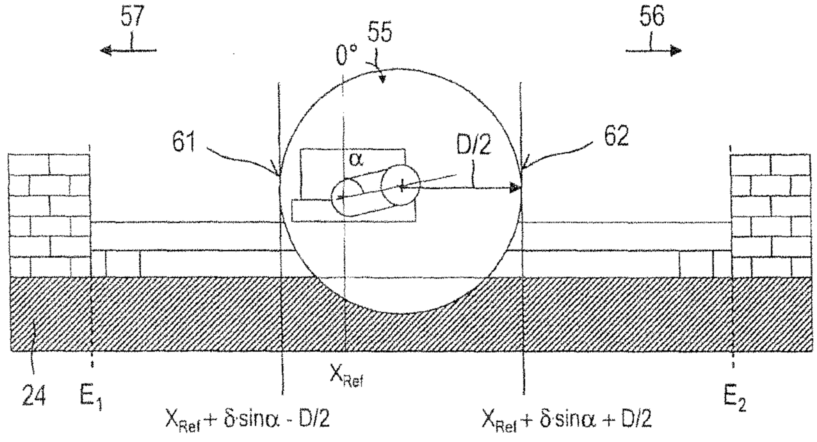

The X-positions of the first and second saw blade edge 61, 62 in direction X can be calculated from reference position $X_{Ref}$ of pivot axis 23, displacement distance $\delta_x$ of rotation axis 19 and saw blade diameter D. FIG. 3A depicts wall saw 12 with saw arm 17 tilted in negative rotation direction 54 at a negative pivot angle $-\alpha$ (0° to −180°). For first saw blade edge 61, $X(61)=X_{Ref}+\delta\cdot\sin(-\alpha)-D/2$ applies and for the second saw blade edge 62, $X(62)=X_{Ref}+\delta\cdot\sin(-\alpha)+D/2$ applies. FIG. 3B depicts wall saw 12 with saw arm 17 tilted in positive rotation direction 55 at a positive pivot angle $\alpha$ (0° to +180°). For first saw blade edge 61, $X(61)=X_{Ref}+\delta\cdot\sin(\alpha)-D/2$ applies and for the second saw blade edge 62, $X(62)=X_{Ref}+\delta\cdot\sin(\alpha)+D/2$ applies.

Figure 4A:
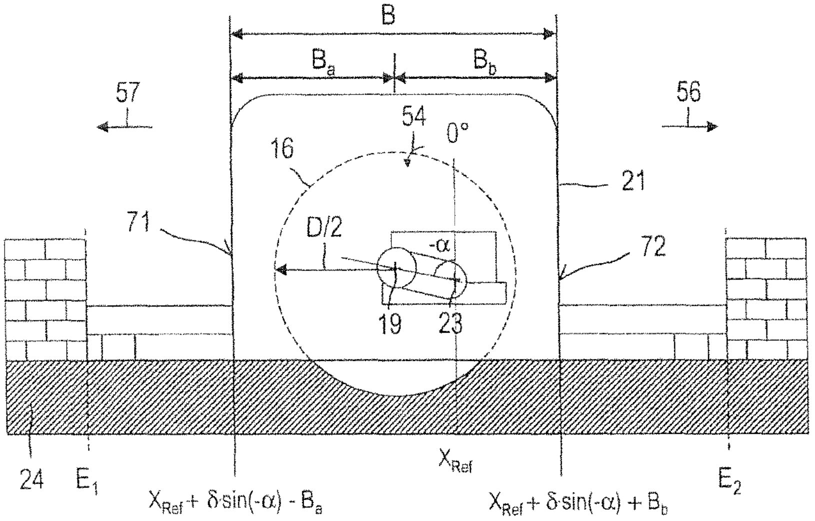
FIGS. 4A, B illustrate processing a separating cut between a first and second obstacle with a saw blade that is enclosed by a blade guard.

FIGS. 4A, B depict wall saw system 10 when making a separating cut between first end point $E_1$ and second end point $E_2$, which are defined as obstacles, wherein the cutting occurs with blade guard 21. When cutting without blade guard 21, the boundary of wall saw 12 is formed by a first blade guard edge 71, which faces first end point $E_1$, and a second blade guard edge 72, which faces second end point $E_2$.

The X-positions of the first and second blade guard edge 71, 72 in direction X can be calculated from reference position $X_{Ref}$ of pivot axis 23, displacement distance $\delta_x$ of rotation axis 19 and blade guard width B. FIG. 4A depicts wall saw 12 with saw arm 17 inclined at a negative pivot angle $-\alpha$ (0° to −180°) and installed blade guard 21 having blade guard width B. Given an asymmetrical blade guard and before the start of the controlled processing, the distances of rotation axis 19 to blade guard edges 71, 72 are determined, wherein the distance to first blade guard edge 71 is referred to as first distance $B_a$ and the distance to second blade guard edge 72 is referred to as second distance $B_b$.

Figure 4B:
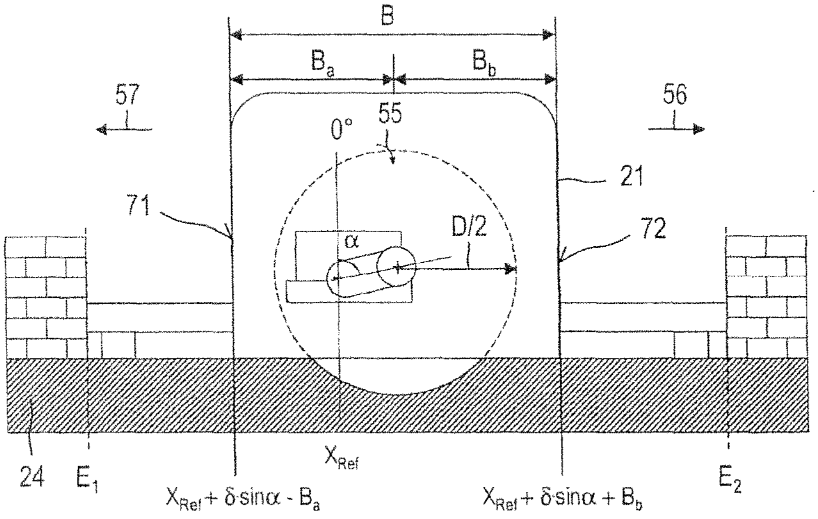

For first blade guard edge 71, $X(71)=X_{Ref}+\delta\ \sin(\alpha)-B_a$ applies, and for the second blade guard edge 72, $X(72)=X_{Ref}+\delta\ \sin(\alpha)+B_b$ applies. FIG. 4B depicts wall saw 12 with saw head 17 tilted at a positive pivot angle $\alpha$ (0° to +180°) and installed blade guard 21 having blade guard width B. For first blade guard edge 71, $X(71)=X_{Ref}+\delta\ \sin(\alpha)-B_a$ applies, and for the second blade guard edge 72, $X(72)=X_{Ref}+\delta\ \sin(\alpha)+B_b$ applies.

FIGS. 2A, B depict a separating cut between two end points $E_1$, $E_2$ that are defined as free end points without obstacles, and FIGS. 3A, B and 4A, B depict a separating cut between two end points $E_1$, $E_2$ that are defined as obstacles. In actual practice, separating cuts are also possible in which one end point is defined as an obstacle and the other end point represents an end point without an obstacle, wherein the control of the wall saw for the free end point occurs via the upper exit point of the saw blade and for the obstacle via the saw blade edge (cutting without blade guard 21) or the blade guard edge (cutting with blade guard 21).

First upper exit point 58, first saw blade edge 61, and first blade guard edge 71 are combined under the term "first boundary" of wall saw 12 and the second upper exit point 59, second saw blade edge 62 and second blade guard edge 72 are combined under the term "second boundary."

FIGS. 5A-K depict wall saw system 10 of FIG. 1 with guide track 11 and wall saw 12 when making a separating cut having end depth T in workpiece 24 between first end point $E_1$, which represents an obstacle, and a second end point $E_2$, which is defined as a free end point without an obstacle.

Processing the separating cut occurs using the method according to the invention for controlling a wall saw system. The separating cut is made in a main cutting sequence of multiple main cuts until the desired end depth T is reached. The main cutting sequence comprises a first main cut having a first main cutting angle at of saw arm 17, a first diameter $D_1$, and a first penetration depth $h_1$ of the utilized saw blade, a second main cut having a second main cutting angle $\alpha_2$ of saw arm 17, a second diameter $D_2$, and a second penetration depth $h_2$ of the utilized saw blade, as well as a third main cut having a third main cutting angle $\alpha_3$ of saw arm 17, a third diameter $D_3$, and a third penetration depth $h_3$ of the utilized saw blade.

The first, second, and third main cuts are performed by saw blade 16 having saw blade diameter D and by blade guard 21 having blade guard width B. The diameters $D_1$, $D_2$, $D_3$ of main cuts coincide with saw blade diameter D; likewise, widths $B_1$, $B_2$, $B_3$ of main cuts coincide with blade guard width B.

The main cuts of a separating cut are performed advantageously either with a saw arm 17 in a pulling configuration or saw arm 17 is arranged alternatingly in a pulling and pushing configuration. The pulling configuration of saw arm 17 allows for a stable guiding of the saw blade when cutting and a narrow cutting gap. A separating cut, in which saw arm 17 is configured in an alternating pulling and pushing manner, has the advantage that the non-productive times required to position saw head 14 and pivoting around saw arm 17 are reduced. In the embodiment, saw head 14 in the first main cut and third main cut along with saw arm 17 configured in a pulling manner is moved in positive feed direction 56; for the intermediate second main cut, saw head 14 with saw arm 17 configured in a pushing manner is moved in negative direction 57. In the three main cuts, saw arm 17 is arranged in each case in negative rotation direction 54.

Figure 5A:
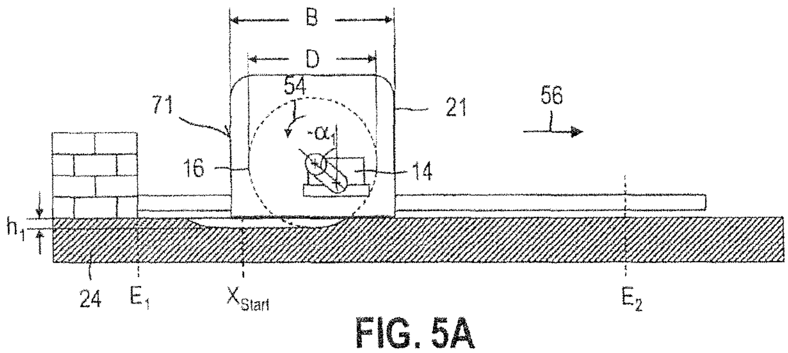
FIGS. 5A-K illustrate the wall saw system of FIG. 1 when making a separating cut between a first end point, which represents an obstacle, and a second free end point without an obstacle.

The processing of the separating cut begins at first end point $E_1$. After starting the method according to the invention, saw head 14 is positioned in a start position $X_{Start}$, in which pivot axis 23 has a distance of $\sqrt{[h_1\cdot(D_1-h_1)]}-\delta\cdot\sin(-\alpha_1)$ to first end point $E_1$, wherein $h_1=h(-\alpha_1, D_1)=D_1/2-\Delta-\delta\cdot\cos(-\alpha_1)$ refers to the penetration depth of the utilized saw blade into workpiece 24 for a negative first main cutting angle $-\alpha_1$ with first diameter $D_1$. First diameter $D_1$ for the first main cut thereby corresponds to sawblade diameter D. In start position $X_{Start}$, saw arm 17 is pivoted out of the basic position at 0° in negative rotation direction 54 into negative first cutting angle $-\alpha_1$. After the pivot motion into negative first cutting angle $-\alpha_1$, first blade guard edge 71 of blade guard 21 abuts the obstacle at first end point $E_1$. Then, saw head 14, with saw arm 17 tilted at negative first main cutting angle $-\alpha_1$ and rotating saw blade 16, is moved into positive feed direction 56 (FIG. 5A). During the feed motion, the position of saw head 14 is measured by displacement sensor 33 on a regular basis.

The feed motion of saw head 14 is stopped when pivot axis 23 has a distance to second end point $E_2$ of $\sqrt{[h_1\cdot(D_1-h_1)]}+\delta\cdot\sin(-\alpha_1)$, wherein $h_1=h(-\alpha_1, D_1)=D_1/2-\Delta-\delta\cdot\cos(-\alpha_1)$ refers to the penetration depth of the utilized saw blade into workpiece 24 given a negative first main angle $-\alpha_1$ with first diameter $D_1$, which corresponds to saw blade diameter D. In this position, second upper exit point 59, facing second end point $E_2$, of saw blade 16 coincides with second end point $E_2$.

The pivot motion from negative first main cutting angle $-\alpha_1$ into negative second main cutting angle $-\alpha_2$ occurs in two steps with an intermediate angle $-ß_{2,1}$. Regarding the intermediate angle, the first index indicates whether the pivot motion occurs at first or second end point $E_1$, $E_2$, wherein index "1" stands for first $E_1$ and index "2" stands for second end point $E_2$. The second index indicates the step and varies from 1 to n−1, n≥2. After the pivot motion of saw arm 17 into intermediate angle $-ß_{2,1}$, a free-cutting of saw blade 16 occurs.

Figure 5B:
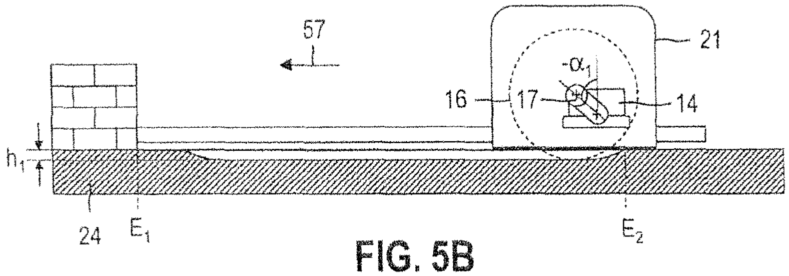
Figure 5C:
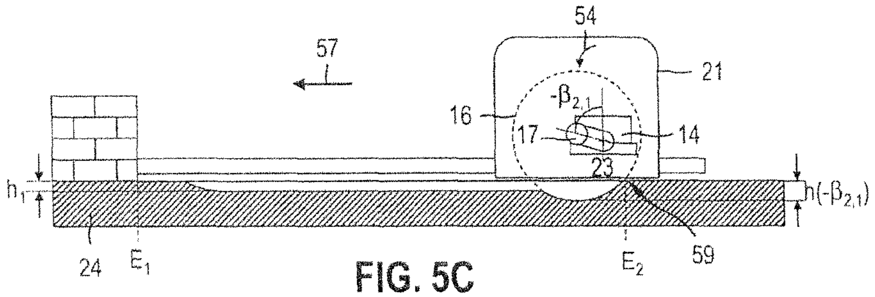

Saw head 14 is positioned in feed direction 28 in such a manner that pivot axis 23 has a distance to second end point $E_2$ of $\sqrt{[h_2(-ß_{2,1})]\cdot(D-h(-ß_{2,1}))]}+\delta\cdot\sin(-ß_{1,1})$, wherein $h(-ß_{2,1})=D_2/2-\Delta-\delta\cdot\cos(-ß_{2,1})$ refers to the penetration depth of the utilized saw blade in workpiece 24 given intermediate angle $-ß_{2,1}$ (FIG. 5B). In this position, saw arm 17 is pivoted out of negative first main angle $-\alpha_1$ into intermediate angle $-ß_{2,1}$ (FIG. 5C). In regard to the positioning in FIG. 5C, the distance is adjusted in such a manner that second upper exit point 59, facing second end point $E_2$, of saw blade 16 coincides with second end point $E_2$ after the pivot motion of saw arm 17 into intermediate angle $-ß_{2,1}$.

Figure 5D:
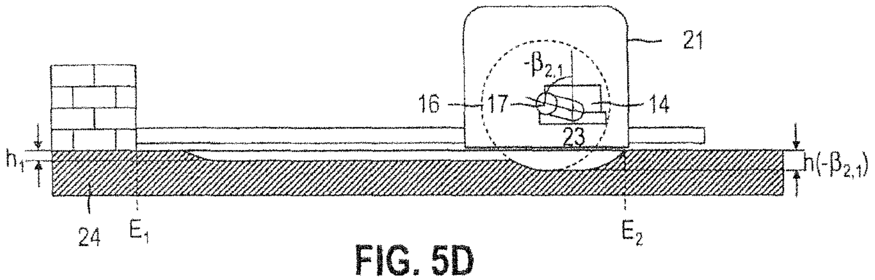
Figure 5E:
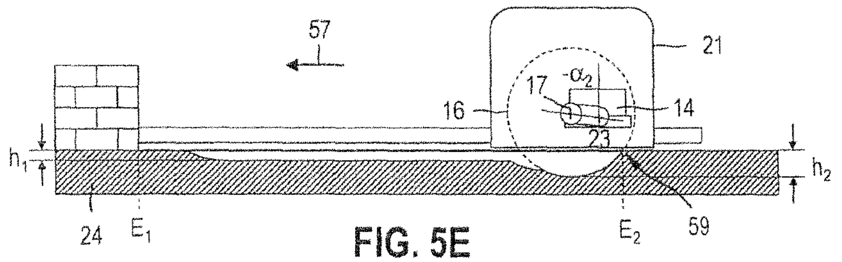

For cutting saw blade 16 free, saw head 14 is moved in negative feed direction 57 by a displacement distance of $\sqrt{[h_2\cdot(D_2-h_2)]}$, wherein $h_2=h(-\alpha_2, D_2)=D_2/2-\Delta-\delta\cdot\cos(-\alpha_2)$ refers to the penetration depth of the saw blade into workpiece 24 given a negative second main cut angle $-\alpha_2$ with second diameter $D_2$, which corresponds to saw blade diameter D (FIG. 5D). Saw head 14 is positioned in feed direction 28 in such a manner that pivot axis 23 has a distance of $\sqrt{[h_2\cdot(D_2-h_2)]}+\delta\cdot\sin(-\alpha_2)$ to second end point $E_2$. In this position, saw arm 17 is pivoted out of intermediate angle $-ß_{2,1}$ into negative second main cutting angle $-\alpha_2$ (FIG. 5E). In regard to the positioning, the distance is adjusted in such a manner that second upper exit point 59, facing second end point $E_2$, of saw blade 16 coincides with second end point $E_2$ after the pivot motion of saw arm 17 into negative second main cutting angle $-\alpha_2$.

Figure 5F:
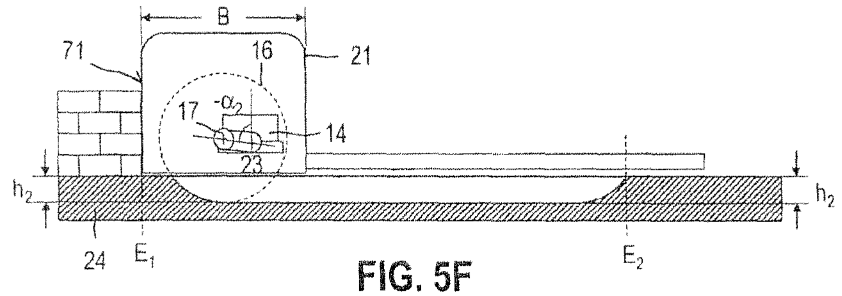

Saw head 14 is moved in negative feed direction 57 toward first end point $E_1$, wherein the position of saw head 14 during the feed motion is measured on a regular basis by displacement sensor 33. The feed motion of saw head 14 is stopped when pivot axis 23 has a distance of $B_2/2-\delta\cdot\sin(-\alpha_2)$ to first end point $E_1$ and first blade guard edge 71 of blade guard 21 abuts the obstacle at first end point $E_1$ (FIG. 5F).

The pivot motion from negative main cutting angle $-\alpha_2$ into negative third main cutting angle $-\alpha_3$ occurs in two steps with an intermediate angle $-\gamma_{2,1}$. Regarding the intermediate angle, the first index indicates whether the pivot motion occurs at first or second end point $E_1$, $E_2$, wherein index "1" stands for first $E_1$, and index "2" stands for second end point $E_2$. The second index indicates the step and varies from 1 to n−1, n≥2.

Figure 5G:
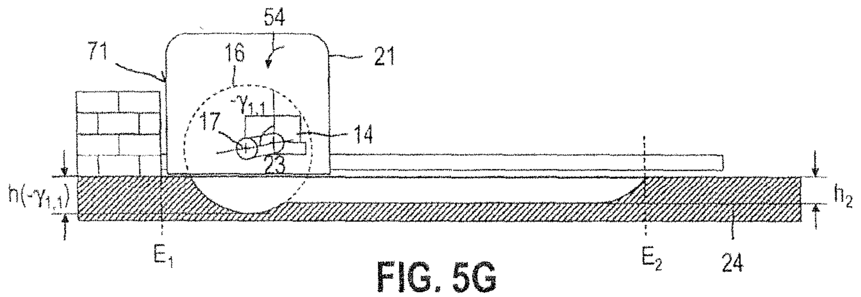
Figure 5H:
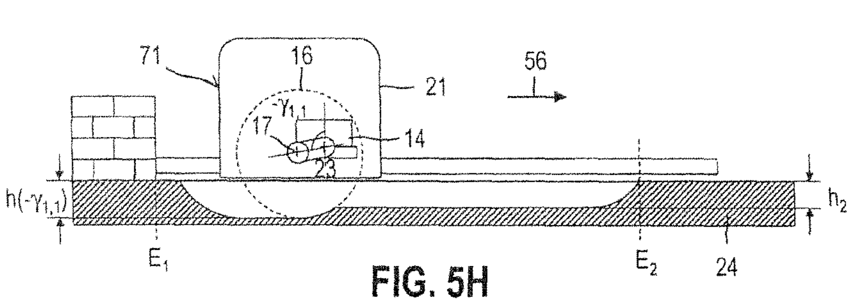

Prior to the pivot motion of saw arm 17 into intermediate angle $-\gamma_{2,1}$, a positioning of saw head 14 occurs. Since the positioning occurs at the obstacle at $E_1$ and intermediate angle $-\gamma_{2,1}$ is less than −90°, it is not possible to position saw head 14 in such a manner that second blade guard edge 72 abuts obstacle $E_1$ after the pivot motion into intermediate angle $-\gamma_{2,1}$. The positioning of saw head 14 occurs by means of critical angle $\alpha_{krit}$ of −90° and saw arm 17 is subsequently pivoted into intermediate angle $-ß_{2,1}$ (FIG. 5G). The critical angle of −90° must be taken into account since first end point $E_1$ may not be exceeded in the pivot motion. At critical angle $\alpha_{krit}$ of −90° pivot axis 23 has a distance of $B(2)/2-\delta\cdot\sin(-90°)=B(2)/2+\delta$ to first end point $E_1$.

Figure 5I:
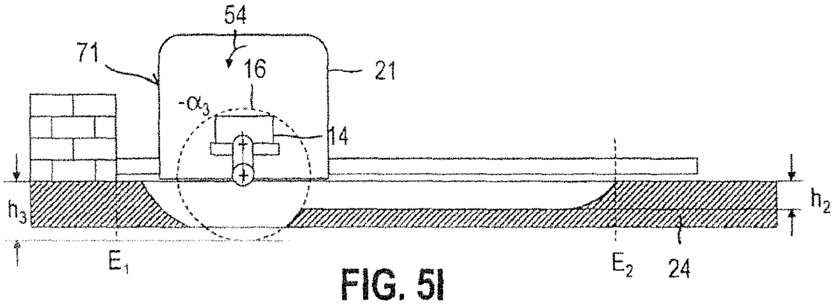

After the pivot motion of saw arm 17 into intermediate angle $-\gamma_{2,1}$, a free-cutting of saw blade 16 occurs. To do so, saw head 14, with saw arm 17 tilted at intermediate angle $-\gamma_{2,1}$ and rotating saw blade 16, is moved in positive feed direction 56 by a displacement distance of $\sqrt{[h_3\cdot(D_3-h_3)]}$ (FIG. 5H), wherein $h_3=h(-\alpha_3, D_3)=D_3/2-\Delta-\delta\cdot\cos(-\alpha_3)=D_3/2-\Delta+\delta$ refers to the penetration depth of saw blade 16 into workpiece 24 given a negative third main angle $-\alpha_3$ with third diameter $D_3$, which corresponds to saw blade diameter D. After the free-cutting, saw head 14 is positioned by means of critical angle $\alpha_{krit}$ of −90° and saw arm 17 is subsequently pivoted out of intermediate angle $-\gamma_{2,1}$ into negative third main cutting angle $-\alpha_3$ (FIG. 5I).

Figure 5J:
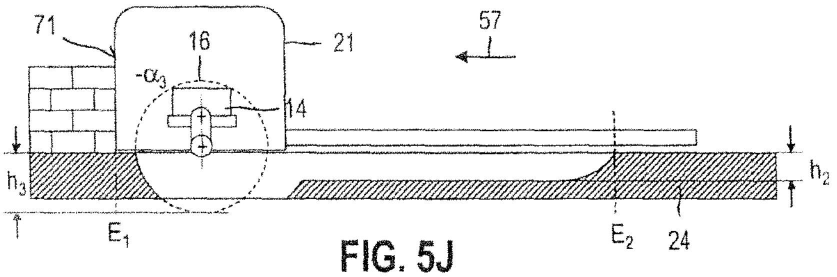

Since the third main cut represents the last main cut of the main cutting sequence, there occurs prior to making the last main cut a corner cutting of first end point $E_1$. To do so, saw head 14, with saw arm 17 tilted at $-\alpha_3$, is moved in negative feed direction 57 until first blade guard edge 71 of blade guard 21 abuts the obstacle at first end point $E_1$(FIG. 5J). The corner cutting of first end point $E_1$ can be improved if blade guard 21 is removed and corner cutting occurs without a blade guard. Without a blade guard, saw head 14, with saw arm 17 tilted at $-\alpha_3$, is moved in negative feed direction 57 until first saw blade edge 61 of saw blade 16 coincides with first end point $E_1$.

Figure 5K:
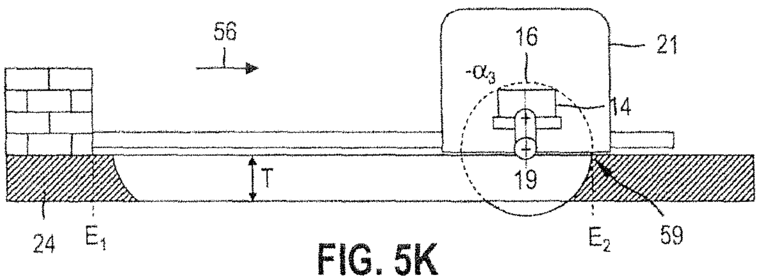

After the corner-cutting of first end point $E_1$, the third main cut, with saw arm 17 tilted at negative third main cutting angle $-\alpha_3$, is performed in positive feed direction 56 (FIG. 5K). The feed motion of saw head 14 is stopped when pivot axis 23 has a distance of $\sqrt{[h_3\cdot(D_3-h_3)]}+\delta\cdot\sin(180°)=\sqrt{[h_3\cdot(D_3-h_3)]}$ to second end point $E_2$, wherein $h(-\alpha_3, D_3)=D_3/2-\Delta-\delta\cdot\cos(180°)=D_3/2-\Delta+\delta$ refers to penetration depth of the saw blade into workpiece 24 given a negative third main angle $-\alpha_3$ with third diameter $D_3$, which corresponds to saw blade diameter D. When an overcut is permitted at second end point $E_2$, there occurs after the third main cut a corner-cutting of second end point $E_2$.

The invention claimed is:

1. A method for controlling a wall saw system, wherein the wall saw system comprises a guide track and a wall saw with a saw head, a motorized feed unit that displaces the saw head parallel to a feed direction along the guide track, at least one saw blade that is attached to a saw arm which is pivotable about a pivot axis of a saw head and is driven about a rotation axis, and at least one removable blade guard enclosing the saw blade;

and comprising the steps of:

making a separating cut of an end depth (T) in a workpiece having a workpiece thickness (d) between a first end point ($E_1$) and a second end point ($E_2$);

wherein, prior to starting a processing of the separating cut, controlled by a control unit of the wall saw system, at least a saw blade diameter (D) of at least one saw blade, positions of the first and second end points ($E_1$, $E_2$) in the feed direction, the end depth (T) of the separating cut, and a main cutting sequence of m main cuts, where m≥2, are established;

wherein the main cutting sequence comprises at least a first main cut having a first main cutting angle ($\alpha_1$) of the saw arm and a first diameter ($D_1$) of the utilized saw blade and a following second main cut having a second main cutting angle ($\alpha_2$) of the saw arm and a second diameter ($D_2$) of the utilized saw blade;

wherein, during the processing controlled by the control unit:

the first main cut is performed with the saw arm tilted at a positive or a negative first main cutting angle ($\pm\alpha_1$) in a positive feed direction; and the second main cut is performed with the saw arm tilted at a positive or a negative second main cutting angle ($\pm\alpha_2$) in a negative feed direction opposite the positive feed direction;

wherein a pivot motion of the saw arm from the first main cutting angle ($\pm\alpha_1$) into the second main cutting angle ($\pm\alpha_2$) is performed in at least two steps with at least one intermediate angle ($\pm ß_1$, $\pm ß_2$), wherein between pivot motions of the saw arm, there occurs in the at least one intermediate angle ($\pm ß_1$, $\pm ß_2$) a free-cutting of the saw blade in each case;

wherein during free-cutting of the saw blade, the saw head is forwarded in the negative feed direction with the saw arm tilted at an intermediate angle in a position such that after pivot motion of the saw arm in the following intermediate angle ($\pm ß_1$, $\pm ß_2$) or in the second main cutting angle ($\pm\alpha_2$) a first boundary of the wall saw coincides with the first end point ($E_1$), if the pivot motion of the saw arm from the first main cutting angle ($\pm\alpha_1$) into the second main cutting angle ($\pm\alpha_2$) occurs at the first end point ($E_1$), or a second boundary of the wall saw coincides with the second end point ($E_2$), if the pivot motion of the saw arm from the first main cutting angle ($\pm\alpha_1$) into the second main cutting angle ($\pm\alpha_2$) occurs at the second end point ($E_2$);

wherein the first boundary is formed by a first upper exit point of the utilized saw blade, facing the first end point ($E_1$), on a top side of the workpiece, if the first end point ($E_1$) is a free end point without an obstacle, by a first saw blade edge of the utilized saw blade, facing the first end point ($E_1$), if the first end point ($E_1$) is an obstacle and the cutting occurs without a blade guard, and by a first blade guard edge of the utilized blade guard, facing the first end point ($E_1$), if the first end point ($E_1$) is an obstacle and the cutting occurs with a blade guard, and the second boundary is formed by a second upper exit point of the utilized saw blade used, facing the second end point ($E_2$), on an upper side of the workpiece, if the second end point ($E_2$) is a free end point without an obstacle, by a second saw blade edge of the utilized saw blade, facing the second end point ($E_2$), if the second end point ($E_2$) is an obstacle and the cutting occurs without a blade guard, and by a second blade edge of the blade guard of the utilized blade guard, facing the second end point ($E_2$), if the second end point ($E_2$) is an obstacle and the cutting occurs with a blade guard.

2. The method according to claim 1, wherein the pivot motion of the saw arm from the first main cutting angle ($\pm\alpha_1$) into the second main cutting angle ($\pm\alpha_2$) is performed in n steps with n−1 intermediate angles ($\pm ß_{1,j}$, $\pm ß_{2,j}$), j=1 to n−1, wherein between the pivot motions of the saw arm, there occurs in the at least one intermediate angle (($\pm ß_{1,j}$, $\pm ß_{2,j}$)) a free-cutting of the saw blade in each case.

3. The method according to claim 1, wherein prior to starting the processing controlled by the control unit, a saw arm length ($\delta$) of the saw arm, which is defined as a distance between the pivot axis and the rotation axis, and a distance ($\Delta$) between the pivot axis and a top side of the workpiece are also established.

4. The method according to claim 3, wherein prior to starting the controlled processing, a first width ($B_1$) is established for a blade guard used in the first main cut and a second width ($B_2$) is established for a blade guard used in the second main cut, wherein the first and second widths ($B_1$, $B_2$) respectively are comprised of a first distance ($B_{1a}$, $B_{2a}$) of the rotation axis to a first blade guard edge of the blade guard and a second distance ($B_{1b}$, $B_{2b}$) of the rotation axis to a second blade guard edge of the blade guard.

5. The method according to claim 3, wherein the pivot motion from the first main cutting angle ($\pm\alpha_1$) into the second main cutting angle ($\pm\alpha_2$) occurs at the first end point $E_1$, and the saw head in the $j^{th}$ step, j=1 to n−1, is positioned in such a manner that after the pivot motion of the saw arm into the $j^{th}$ intermediate angle ($\pm ß_{1,j}$), a first boundary, facing the first end point ($E_1$), of the wall saw coincides with the first end point ($E_1$), wherein the first boundary is formed by a first upper exit point, facing the first end point ($E_1$), of the utilized saw blade on the top side of the workpiece when the first end point ($E_1$) represents a free end point without an obstacle, by a first saw blade edge, facing the first end point ($E_1$), of the utilized saw blade when the first end point ($E_1$) represents an obstacle and the cutting occurs without a blade guard, and by a first blade guard edge, facing the first end point ($E_1$), of the utilized blade guard when the first end point ($E_1$) represents an obstacle and cutting occurs with a blade guard.

6. The method according to claim 5, wherein after the pivot motion of the saw arm into the $j^{th}$ intermediate angle ($\pm ß_{1,j}$), where j=1 to n−1, the first upper exit point coincides with the first end point ($E_1$) when the pivot axis has a distance to the first end point ($E_1$) of $\sqrt{[h(\pm ß_{1,j})\cdot(D-h(\pm ß_{1,j}))]}-\delta\cdot\sin(\pm ß_{1,j})$ wherein $h(\pm ß_{1,j})=D/2-\Delta-\delta\cdot\cos(\pm ß_{1,j})$ refers to a penetration depth of the utilized saw blade into the workpiece for the $j^{th}$ intermediate angle ($\pm ß_{1,j}$), the first saw blade edge of the utilized saw blade coincides with the first end point ($E_1$) when the pivot axis has a distance to the first end point ($E_1$) of $D/2-\delta\cdot\sin(\pm ß_{1,j})$, and the first blade guard edge of the utilized blade guard coincides with the first end point ($E_1$) when the pivot axis has a distance to the first end point ($E_1$) of $B_a-\delta\cdot\sin(\pm\beta_{1,j})$.

7. The method according to claim 6, wherein the saw head in the $j^{th}$ step, where j=1 to n−1, with the saw arm tilted at the $j^{th}$ intermediate angle ($\pm ß_{1,j}$) is moved by a displacement distance of $\sqrt{[h_2\cdot(D-h_2)]}-\delta\cdot\sin(\pm\alpha_2)$, wherein $h_2=h(\alpha_2, D)=D/2-\Delta-\delta\cdot\cos(\pm\alpha_2)$ refers to the penetration depth of the utilized saw blade into the workpiece for the second main cutting angle ($\pm\alpha_2$).

8. The method according to claim 7, wherein the saw head after the $n-1^{th}$ step is positioned in such a manner that after the pivot motion of the saw arm into the second main cutting angle ($\pm\alpha_2$), the first boundary, facing the first end point ($E_1$), of the wall saw coincides with the first end point ($E_1$).

9. The method according to claim 8, wherein after the pivot motion of the saw arm into the second main cutting angle ($\pm\alpha_2$), the first upper exit point coincides with the first end point ($E_1$) when the pivot axis has a distance to the first end point ($E_1$) of $\sqrt{[h_2\cdot(D-h_2)]}-\delta\cdot\sin(\pm\alpha_2)$, wherein $h(\pm\alpha_2)=D/2-\Delta-\delta\cdot\cos(\pm\alpha_2)$ refers to the penetration depth of the utilized saw blade into the workpiece for the second main cutting angle ($\pm\alpha_2$) with the second diameter ($D_2$), the first saw blade edge of the utilized saw blade coincides with the first end point ($E_1$) when the pivot axis has a distance to the first end point ($E_1$) of $D_2/2-\delta\cdot\sin(\pm\alpha_2)$, and the first blade guard edge of the utilized blade guard coincides with the first end point ($E_1$) when the pivot axis has a distance to the first end point ($E_1$) of $B_{2a}-\delta\cdot\sin(\pm\alpha_2)$.

10. The method according to claim 3, wherein the pivot motion from the first main cutting angle ($\pm\alpha_1$) into the second main cutting angle ($\pm\alpha_2$) occurs at the second end point ($E_2$) and the saw head in the $j^{th}$ intermediate cut, j=1 to n−1, is positioned in such a manner that after the pivot motion of the saw arm into the $j^{th}$ intermediate angle ($\pm ß_{2,j}$), a second boundary, facing the second end point ($E_2$), of the wall saw coincides with the second end point ($E_2$), wherein the second boundary of the wall saw is formed by a second upper exit point, facing the second end point ($E_2$), of the utilized saw blade on the top side of the workpiece when the second end point ($E_2$) represents a free end point without an obstacle, by a second saw blade edge, facing the second end point ($E_2$), of the utilized saw blade when the second end point ($E_2$) represents an obstacle and the processing occurs without a blade guard, and by a second blade guard edge, facing the second end point ($E_2$), of the utilized blade guard when the second end point ($E_2$) represents an obstacle and the processing occurs with a blade guard.

11. The method according to claim 10, wherein after the pivot motion of the saw arm into the $j^{th}$ intermediate angle ($\pm ß_{2,j}$), where j=1 to n−1, the second upper exit point coincides with the second end point ($E_2$) when the pivot axis has a distance to the second end point ($E_2$) of $\sqrt{[h(\pm ß_{2,j}) \cdot (D-h(\pm ß_{2,j}))]}+\delta \cdot \sin(\pm ß_{2,j})$, wherein $h(\pm ß_{2,j})=D/2-\Delta-\delta \cdot \cos(\pm ß_{2,j})$ refers to the penetration depth of the utilized saw blade into the workpiece for the $j^{th}$ intermediate angle ($\pm ß_{2,j}$), the second saw blade edge of the utilized saw blade coincides with the second end point ($E_2$) when the pivot axis has a distance to the second end point ($E_2$) of $D/2+\delta \cdot \sin(\pm ß_{2,j})$, and the second blade guard edge of the utilized blade guard coincides with the second end point ($E_2$) when the pivot axis has a distance to the second end point of $B_b+\delta \cdot \sin(\pm ß_{2,j})$.

12. The method according to claim 11, wherein the saw head in the $j^{th}$ step, where j=1 to n−1, with the saw head tilted at the $j^{th}$ intermediate angle ($\pm ß_{2,j}$) is moved by a displacement distance of $\sqrt{[h_2 \cdot (D-h_2)]}-\delta \cdot \sin(\pm\alpha_2)$, wherein $h_2=h(\pm\alpha_2, D)=D/2-\Delta-\delta \cdot \cos(\pm\alpha_2)$ refers to the penetration depth of the utilized saw blade into the workpiece for the second main cutting angle ($\pm\alpha_2$).

13. The method according to claim 12, wherein the saw head after the $n-1^{th}$ step is positioned in such a manner that after the pivot motion of the saw arm into the second main cutting angle ($\pm\alpha_2$), the second boundary facing the second end point ($E_2$), of the wall saw coincides with the second end point ($E_2$).

14. The method according to claim 13, wherein after the pivot motion of the saw arm into the second main cutting angle ($\pm\alpha_2$), the second upper exit point coincides with the second end point ($E_2$) when the pivot axis has a distance to the second end point ($E_2$) of $\sqrt{[h_2 \cdot (D-h_2)]}+\delta \cdot \sin(\pm\alpha_2)$, wherein $h(\pm\alpha_2)=D/2-\Delta-\delta \cdot \cos(\pm\alpha_2)$ refers to the penetration depth of the utilized saw blade into the workpiece for the second main cutting angle ($\pm\alpha_2$), the second saw blade edge of the utilized saw blade coincides with the second end point ($E_2$) when the pivot axis has a distance to the second end point ($E_2$) of $D/2+\delta \cdot \sin(\pm\alpha_2)$, and the second blade guard edge of the utilized blade guard coincides with the second end point ($E_2$) when the pivot axis has a distance to the second end point ($E_2$) of $B_{2b}+\delta \cdot \sin(\pm\alpha_2)$.

* * * * *